US009133584B2

(12) United States Patent
Sanchez et al.

(10) Patent No.: US 9,133,584 B2
(45) Date of Patent: Sep. 15, 2015

(54) METHOD OF PREPARING A TREATED ARTICLE AND TREATED ARTICLE FORMED THEREFROM

(71) Applicant: AGC Chemicals Americas, Inc., Exton, PA (US)

(72) Inventors: Michael J. Sanchez, Fleetwood, PA (US); James L. Scott, Downingtown, PA (US)

(73) Assignee: AGC CHEMICALS AMERICAS, INC., Exton, PA (US)

(*) Notice: Subject to any disclaimer, the term of this patent is extended or adjusted under 35 U.S.C. 154(b) by 0 days.

(21) Appl. No.: 14/304,597

(22) Filed: Jun. 13, 2014

(65) Prior Publication Data

US 2014/0290883 A1    Oct. 2, 2014

Related U.S. Application Data

(63) Continuation of application No. 13/351,286, filed on Jan. 17, 2012, now Pat. No. 8,771,470.

(51) Int. Cl.
| | |
|---|---|
| *D21H 23/04* | (2006.01) |
| *D21H 23/22* | (2006.01) |
| *D21H 21/16* | (2006.01) |
| *D21H 23/72* | (2006.01) |
| *B32B 27/10* | (2006.01) |
| *D21H 27/10* | (2006.01) |
| *D21H 17/34* | (2006.01) |
| *D21H 19/20* | (2006.01) |
| *D21H 23/02* | (2006.01) |
| *D21H 23/24* | (2006.01) |
| *D21H 27/00* | (2006.01) |
| *B65D 65/42* | (2006.01) |

(52) U.S. Cl.
CPC ............... *D21H 23/72* (2013.01); *B32B 27/10* (2013.01); *D21H 17/34* (2013.01); *D21H 19/20* (2013.01); *D21H 21/16* (2013.01); *D21H 23/02* (2013.01); *D21H 23/04* (2013.01); *D21H 23/24* (2013.01); *D21H 27/00* (2013.01); *D21H 27/10* (2013.01); *B65D 65/42* (2013.01)

(58) Field of Classification Search
CPC ......... D21H 17/11; D21H 7/34; D21H 17/36; D21H 17/37; D21H 17/42; D21H 17/43; D21H 17/44; D21H 17/45; D21H 17/53; D21H 17/54; D21H 17/56; D21H 17/57; D21H 19/20; D21H 21/16; D21H 27/10; D21H 23/02; D21H 23/04; D21H 23/22; D21H 23/24; D21H 11/16; D21H 27/00; D21H 23/72; B32B 27/10; B65D 65/42
USPC ................ 162/135–137, 158, 164.1, 164.3, 162/168.1–168.2, 175, 183–185; 428/172, 428/195.1
See application file for complete search history.

(56) References Cited

U.S. PATENT DOCUMENTS

| | | | |
|---|---|---|---|
| 3,651,069 A | 3/1972 | Sweeney et al. | |
| 3,809,663 A | 5/1974 | Elkind et al. | |
| 3,813,359 A | 5/1974 | Hunter, Jr. et al. | |
| 5,453,540 A * | 9/1995 | Dams et al. | ...... 564/96 |
| 5,674,961 A | 10/1997 | Fitzgerald | |
| 6,566,470 B2 * | 5/2003 | Kantamneni et al. | ...... 526/245 |
| 6,933,338 B2 | 8/2005 | Sugimoto et al. | |
| 7,485,688 B2 | 2/2009 | Maekawa et al. | |
| 7,666,940 B2 | 2/2010 | Iengo et al. | |
| 7,754,917 B2 * | 7/2010 | Kantamneni | ...... 564/133 |
| 8,193,276 B2 | 6/2012 | Sugimoto et al. | |
| 8,680,223 B2 * | 3/2014 | Jin et al. | ...... 526/245 |
| 8,771,470 B2 * | 7/2014 | Sanchez et al. | ...... 162/185 |
| 2005/0000668 A1 | 1/2005 | Iengo et al. | |
| 2006/0201645 A1 | 9/2006 | Ito | |
| 2007/0020462 A1 | 1/2007 | Rudolph et al. | |
| 2007/0221348 A1 | 9/2007 | Iengo et al. | |
| 2008/0315147 A1 * | 12/2008 | Kantamneni | ...... 252/8.62 |
| 2009/0050282 A1 | 2/2009 | Faucher et al. | |
| 2009/0155600 A1 | 6/2009 | Usugaya et al. | |
| 2010/0168319 A1 | 7/2010 | Sugimoto et al. | |
| 2011/0027593 A1 | 2/2011 | Matsuda et al. | |
| 2011/0143622 A1 | 6/2011 | Raghavanpillai | |
| 2011/0178260 A1 | 7/2011 | Peng et al. | |
| 2012/0199304 A1 | 8/2012 | Cheng et al. | |
| 2014/0106165 A1 * | 4/2014 | Johnston et al. | ...... 428/342 |
| 2014/0290883 A1 * | 10/2014 | Sanchez et al. | ...... 162/135 |

FOREIGN PATENT DOCUMENTS

| | | |
|---|---|---|
| EP | 0207588 A1 | 1/1987 |
| EP | 462063 A1 * | 12/1991 |
| EP | 0972635 A1 | 1/2000 |
| EP | 1942225 A1 | 7/2008 |
| JP | 2005344032 A * | 12/2005 |
| WO | WO 2004069924 A1 * | 8/2004 |
| WO | WO 2009047943 A1 * | 4/2009 |
| WO | WO 2011027877 A1 * | 3/2011 |
| WO | WO2011027877 A1 | 3/2011 |
| WO | WO2011099650 A1 | 8/2011 |
| WO | WO 2013137386 A1 * | 9/2013 |

* cited by examiner

OTHER PUBLICATIONS

PCT International Search Report, PCT/US2013/021560, dated May 29, 2013, 3 pages.

*Primary Examiner* — Jose Fortuna
(74) *Attorney, Agent, or Firm* — Howard & Howard Attorneys PLLC

(57) ABSTRACT

A method of preparing a treated article comprises the step of providing a slurry comprising fibers. The method further comprises the step of combining the slurry and a first fluorinated composition to form a mixture. In addition, the method comprises the step of forming at least one sheet from the mixture. Finally, the method comprises the step of applying a second fluorinated composition on at least one surface of the at least one sheet to prepare the treated article.

19 Claims, No Drawings

METHOD OF PREPARING A TREATED ARTICLE AND TREATED ARTICLE FORMED THEREFROM

CROSS-REFERENCE TO RELATED APPLICATIONS

This application is a continuation of application Ser. No. 13/351,286, which was filed on Jan. 17, 2012.

FIELD OF THE INVENTION

The present invention generally relates to a method of preparing a treated article and, more specifically, to a method of preparing a treated article having excellent resistance to oil and water.

DESCRIPTION OF THE RELATED ART

Various methods of treating articles are known in the art and are generally tailored based on the particular end use of the articles. For example, in certain industries, such as the textile industry, textile articles are treated to impart the textile articles with desirable physical properties, such as resistance to oil and/or water. One textile article that is commonly treated for purposes of imparting the textile article with such properties is paper. For example, treated paper is utilized in the fast food industry to prevent oil and grease from permeating the packaging of food items, e.g. fried foods. Fluoropolymers are typically utilized when preparing treated textile articles to impart the treated textile articles with resistance to oil and/or water.

SUMMARY OF THE INVENTION

The present invention provides a method of preparing a treated article. The method comprises the step of providing a slurry comprising fibers. The method further comprises the step of combining the slurry and a first fluorinated composition to form a mixture. In addition, the method comprises the step of forming at least one sheet from the mixture. Finally, the method comprises the step of applying a second fluorinated composition on at least one surface of the at least one sheet to prepare the treated article.

The method of the present invention prepares treated articles having excellent physical properties, including resistance to oil and water, even when such treated articles are creased or otherwise deformed. For example, conventional treated articles typically have desirable resistance to creasing yet have undesirable surface performance, or conventional treated articles have desirable surface performance which suffers considerably when the treated articles are creased or otherwise bent/deformed. However, the method of the present invention prepares treated articles having both excellent surface performance and resistance to creasing. Additionally, the method of the present invention utilizes the first and second fluorinated compositions, which has a synergistic effect, thereby reducing costs and volume relative to methods utilizing conventional fluorinated compositions.

DETAILED DESCRIPTION OF THE INVENTION

The present invention provides a method of preparing a treated article. The method of the present invention prepares treated articles having excellent physical properties, including oil and water repellency, as described in greater detail below. The method of the present invention is particularly suitable for preparing treated paper; however, it is to be appreciated that the method is not limited to such articles. For example, the method may be utilized to prepare other articles comprising fibers, such as natural and/or synthetic textiles.

The method comprises the step of providing a slurry comprising fibers. The slurry may be provided in any suitable manner. For example, the slurry may be prepared, obtained, purchased, etc. The fibers of the slurry may comprise natural fibers, synthetic fibers, semi-synthetic fibers, inorganic fibers, and combinations thereof. Specific examples of natural fibers include those derived from plant or wood matter, which may also be referred to as cellulosic fibers, such as bamboo fibers, bent grass fibers, sawgrass fibers, bagasse fibers, straw fibers, hay fibers, spruce fibers, pine fibers, fir fibers, larch fibers, eucalyptus fibers, aspen fibers, birch fibers, etc. When the natural fibers are derived from wood matter, the wood matter may be softwood and/or hardwood. Other examples of natural fibers include cotton, hemp, wool, silk, etc. Specific examples of synthetic fibers include polyamide fibers, polyester fibers, polyvinyl alcohol fibers, polyacrylonitrile fibers, polyvinyl chloride fibers, polypropylene fibers, etc. Specific examples of semi-synthetic fibers include rayon, acetate, etc. Specific examples of inorganic fibers include glass fibers, carbon fibers, asbestos fibers, etc. In certain embodiments, the fibers of the slurry comprise natural fibers, such as cellulosic fibers.

When the step of providing the slurry comprises preparing the slurry, the slurry may be prepared in accordance with methods generally known in the art. For example, in embodiments in which the fibers comprise cellulosic fibers, the slurry may be prepared by mechanical pulping processes; thermomechanical pulping processes; chemithermomechanical pulping processes; chemical pulping processes, such as Kraft processes, Sulfite processes, and Soda processes; recycled pulping processes; organosolv pulping processes; etc. Alternatively, the slurry may be prepared by purchasing or otherwise obtaining dried cellulosic fibers, which are generally referred to in the art as "market pulp." In these embodiments, the market pulp is generally reconstituted into water, which is referred to as hydropulping. The fibers may be bleached, contingent upon the desired appearance of the treated article. When bleached, the fibers may be bleached with, for example, chlorine, chlorine dioxide, oxygen, ozone, hydrogen peroxide, etc.

Typically, the fibers are present in the slurry in an amount of from greater than 0 to 5, alternatively from 0.5 to 3.75, alternatively from 1.0 to 2.5 percent by weight based on the total weight of the slurry. Of course, it is to be appreciated that the fibers may be present in the slurry in amounts other than those set forth above contingent on the presence or absence of various optional components, as described in greater detail below. The balance of the slurry typically comprises water or a combination of water and a water-soluble solvent, as described in greater detail below.

In certain embodiments in which the fibers comprise cellulosic fibers, the fibers of the slurry are typically refined. Typically, the fibers of the slurry are refined by subjecting the slurry to shear forces, which separate cellulosic masses or fiber clusters into individual fibers. Generally, the fibers of the slurry are not refined until the slurry is prepared or provided, i.e., "market pulp" is typically not refined until it has been reconstituted into water to form the slurry.

The method further comprises the step of combining the slurry and a first fluorinated composition to form a mixture. Most typically, the first fluorinated composition is further defined as an anionic fluorinated composition. However, in other embodiments, the first fluorinated composition is further defined as a cationic fluorinated composition.

In certain embodiments in which the first fluorinated composition is the anionic fluorinated composition, the first fluorinated composition comprises a first fluorinated copolymer. The first fluorinated polymer typically comprises from 40 to 98 mass % of polymerized units (a') based on monomer (a), from 1 to 50 mass % of polymerized units (b') based on monomer (b) and from 1 to 10 mass % of polymerized units (c') based on monomer (c). Monomers (a), (b) and (c) are described in greater detail below with reference to the first fluorinated polymer of the first fluorinated composition. In addition, this specific example of the first fluorinated polymer is described in U.S. Publ. Pat. Appln. No. 2010/0168319, which is incorporated by reference herein in its entirety.

Monomer (a), which is utilized to form the first fluorinated polymer, comprises a compound represented by $(Z—Y)_aX$, wherein Z is a $C_{1-6}$ perfluoroalkyl group or a monovalent group represented by $C_bF_{2b+1}O(CFWCF_2O)_cCFK—$, wherein b is an integer of from 1 to 6, c is an integer of from 1 to 4, and each of W and K which are independent of each other, is a fluorine atom or a trifluoromethyl group, Y is a single bond or a bivalent organic group containing no fluorine atom, a is 1 or 2, provided that when a is 1, X is $—CR=CH_2$, $—COOCR=CH_2$, $—OCOCR=CH_2$, $—OCH_2\text{-}\phi\text{-}CR=CH_2$ or $—OCH=CH_2$, and when a is 2, X is $—CH[—(CH_2)_dCR=CH_2]—$, $—CH[—(CH_2)_dCOOCR=CH_2]—$, $—CH[—CH_2)_dOCOCR=CH_2]—$ or $—OCOCH=CHCOO—$, R is a hydrogen atom, a methyl group or a halogen atom, $\phi$ is a phenylene group, d is an integer of from 0 to 4, and when a is 2, two (Z—Y) present in one molecule may be the same or different from each other.

Monomer (b), which is utilized to form the first fluorinated polymer, comprises a compound represented by $CH_2=CR^1\text{-}G\text{-}(R^2O)_e—R^3$, wherein $R^1$ is a hydrogen atom or a methyl group, $R^2$ is a $C_{2-4}$ alkylene group, or a $C_{2-3}$ alkylene group having some or all of its hydrogen atoms substituted by hydroxyl groups, e is an integer of from 1 to 10, G is $—COO(CH_2)_f—$ or $—COO(CH_2)_g—NHCOO—$, wherein f is an integer of from 0 to 4, and g is an integer of from 1 to 4, and $R^3$ is a hydrogen atom, a methyl group, an acryloyl group, a methacryloyl group or an allyl group.

Finally, monomer (c), which is also utilized to form the first fluorinated polymer, comprises a compound represented by $CH_2=C(COOH)\text{-}Q\text{-}COOH$, wherein Q is a $C_{1-4}$ alkylene group, or a $C_{2-3}$ alkylene group having some or all of its hydrogen atoms substituted by hydroxyl groups, and in the monomer (c), some or all of the carboxyl groups may form at least one salt selected from an ammonium salt and an organic amine salt.

Alternatively, in embodiments in which the first fluorinated composition is the anionic fluorinated composition, the first fluorinated composition comprises a second fluorinated copolymer. One specific example of the second fluorinated polymer is described in International (PCT) Publication No. WO2011/027877, which is incorporated by reference herein in its entirety. The second fluorinated polymer described in International (PCT) Publication No. WO2011/027877 is set forth in greater detail below.

In particular, in certain embodiments, the second fluorinated polymer comprises repeating units derived from: (a) a fluorine-containing monomer having a fluoroalkyl group represented by the general formula:

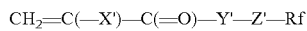

wherein X' represents a hydrogen atom, a linear or branched $C_1$ to $C_{21}$ alkyl group, a halogen atom, a $CFX^1X^2$ group wherein $X^1$ and $X^2$ are a hydrogen atom, a halogen atom, a cyano group, a linear or branched $C_1$-$C_{21}$ fluoroalkyl group, a substituted or non-substituted benzyl group, or a substituted or non-substituted phenyl group; Y' is $—O—$ or $—NH—$; Z' is a $C_1$-$C_{10}$ aliphatic group, a $C_6$-$C_{10}$ aromatic or cyclic aliphatic group, a $—CH_2CH_2N(R^4)SO_2—$ group wherein $R^4$ is a $C_1$-$C_4$ alkyl group, a $—CH_2CH(OZ^1)CH_2—$ group wherein $Z^1$ is a hydrogen atom or an acetyl group, a $—(CH_2)_h—SO_2—(CH_2)_i—$ group or a $—(CH_2)_h—S—(CH_2)_i—$ group wherein h is 1-10 and i is 0-10; and Rf is a $C_1$-$C_6$ linear or branched fluoroalkyl group; (b) a hydrophilic monomer, and (c) a monomer having an anion-donating group. The second fluorinated copolymer typically has a weight average molecular weight of 100,000 or more. Specific examples of (a), (b) and (c) are provided in International (PCT) Publication No. WO2011/027877.

As introduced above, in various embodiments, the first fluorinated composition is a cationic fluorinated composition. In certain embodiments in which the first fluorinated composition is the cationic fluorinated composition, the first fluorinated composition comprises a third fluorinated copolymer. One specific example of the third fluorinated copolymer is described in U.S. Pat. No. 6,933,338, which is incorporated by reference herein in its entirety.

The third fluorinated copolymer typically comprises (1) a monomer unit based on a (meth)acrylate having a polyfluoroalkyl group; (2) a monomer unit based on an alkyl(meth)acrylate having a $C_{16}$-$C_{12}$ alkyl group; (3) a monomer unit based on an alkyl(meth)acrylate having a $C_1$-$C_{22}$ alkyl group; and (4) a monomer unit based on at least one compound selected from the group consisting of 2-isocyanate ethyl methacrylate, 1,3,3-trimethyl-4-isocyanate cyclohexylmethylamidoxyethyl methacrylate of general formula 1 below and 1,3,3-trimethyl-4-isocyanate cyclohexylmethylamidoxyethyl acrylate of general formula 2 below, the isocyanate group of which is blocked. General formula 1 is as follows:

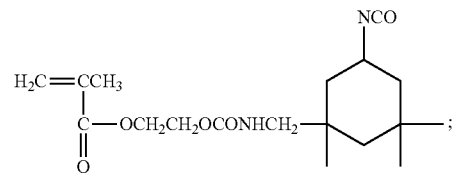

and general formula 2 is

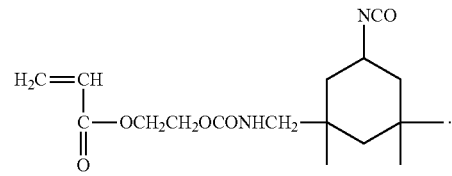

Specific examples of monomer units (1)-(4) are described in U.S. Pat. No. 6,933,338.

Alternatively, in embodiments in which the first fluorinated composition is the cationic fluorinated composition, the first fluorinated composition comprises a fourth fluorinated copolymer. One specific example of the fourth fluorinated copolymer is disclosed in U.S. Pat. No. 7,485,688, which is incorporated by reference herein in its entirety.

In certain embodiments, the fourth fluorinated copolymer comprises 60 to 98 mass % of polymerized units (d)' based on monomer (d), from 1 to 20 mass % of polymerized units (e)' based on monomer (e) and from 1 to 30 mass % of polymerized units (f)' based on monomer (f), which are each described in greater detail below.

In particular, monomer (d), which is utilized to form the fourth fluorinated copolymer, comprises a compound represented by $(Z''-Y'')_jX''$, wherein $Z''$ is a $C_{1-6}$ perfluoroalkyl group or a group represented by $C_kF_{2k+1}O(CFW'CF_2O)_l$ $CFK'-$, wherein k is an integer of from 1 to 6, l is an integer of from 1 to 4, and each of W' and K' is independently a fluorine atom or $-CF_3$, Y'' is a bivalent organic group or a single bond, j is 1 or 2, and X'' is a polymerizable unsaturated group provided that when j is 1, X'' is $-CR^5=CH_2$, $-COOCR^5=CH_2$, $-OCOCR^5=CH_2$, $-OCH_2-\phi-CR^5=CH_2$ or $-OCH=CH_2$, and when j is 2, X'' is $=CH(CH_2)_mCR^5=CH_2$, $=CH(CH_2)_mCOOCR^5=CH_2$, $=CH(CH_2)_mOCOCR^5=CH_2$ or $-OCOCH=CHCOO-$, wherein $R^5$ is a hydrogen atom, a methyl group or a halogen atom, $\phi$ is a phenylene group, and m is an integer of from 0 to 4.

Monomer (e), which is utilized to form the fourth fluorinated copolymer, comprises a compound represented by $CH_2=CR^6\text{-}G'\text{-}(R^7O)_n-R^8$, wherein $R^6$ is a hydrogen atom or a methyl group, $R^7$ is a $C_{2-4}$ alkylene group or an otherwise $C_{2-3}$ alkylene group in which some or all of the hydrogen atoms have been replaced by hydroxyl groups, n is an integer of from 1 to 50, G' is $-COO(CH_2)_o-$ or $-COO(CH_2)_s-NHCOO-$, wherein o is an integer of from 0 to 4, and s is an integer of from 1 to 4, and $R^8$ is at least one of an acryloyl group and a methacryloyl group.

Finally, monomer (f), which is utilized to form the fourth fluorinated copolymer, comprises a compound represented by $CH_2=CR^9\text{-}M\text{-}Q'\text{-}NR^{10}R^{11}$ or $CH_2=CR^9\text{-}M\text{-}Q'\text{-}N(O)R^{10}R^{11}$, wherein $R^9$ is a hydrogen atom or a methyl group, M is $-COO-$ or $-CONH-$, Q' is a $C_{2-4}$ alkylene group or an otherwise $C_{2-3}$ alkylene group in which some or all of the hydrogen atoms have been replaced by hydroxyl groups, and each of $R^{10}$ and $R^{11}$ comprises a benzyl group, a $C_{1-8}$ alkyl group or an otherwise $C_{2-3}$ alkylene group in which some of the hydrogen atoms have been replaced by hydroxyl groups, or $R^{10}$ and $R^{11}$ may form a morpholino group, a piperidino group or a pyrrolidinyl group, together with a nitrogen atom.

When the first fluorinated composition is the anionic fluorinated composition, the first fluorinated composition may comprise one or more fluorinated polymers other than or in addition to the first fluorinated polymer or the second fluorinated polymer. Similarly, the first fluorinated composition may comprise a combination of the first and second fluorinated polymers, and may further comprise additional fluorinated polymers. Typically, when the first fluorinated composition is anionic, the anionicity of the first fluorinated composition is derived from the particular fluorinated polymer utilized. Accordingly, the particular fluorinated polymer utilized (e.g. the first and/or second fluorinated polymers) is generally anionic.

In alternative embodiments in which the first fluorinated composition is the cationic fluorinated composition, the first fluorinated composition may comprise one or more fluorinated polymers other than or in addition to the third fluorinated polymer or the fourth fluorinated polymer. Similarly, the first fluorinated composition may comprise a combination of the third and fourth fluorinated polymers, and may further comprise additional fluorinated polymers. Typically, when the first fluorinated composition is cationic, the cationicity of the first fluorinated composition is derived from the particular fluorinated polymer utilized. Accordingly, the particular fluorinated polymer utilized (e.g. the third and/or fourth fluorinated polymers) is generally cationic.

Because the first fluorinated composition may comprise any of the first, second, third, and/or fourth fluorinated copolymers, or fluorinated polymers other than or in addition to the first, second, third, and/or fourth fluorinated copolymers, the particular fluorinated polymer(s) employed in the first fluorinated composition is merely referred to herein as "the fluorinated polymer of the first fluorinated composition" for purposes of brevity and clarity. It is to be appreciated that the terminology "the fluorinated polymer of the first fluorinated composition" encompasses any combination of the first, second, third, and/or fourth fluorinated copolymers, as well as fluorinated polymers other than or in addition to the first, second, third, and/or fourth fluorinated copolymers.

The first fluorinated composition is typically a dispersion of the fluorinated polymer in an aqueous medium. The fluorinated polymer generally has a particle size of at most 100 nm, alternatively at most 50 nm, alternatively at most 10 nm, while dispersed in the aqueous medium.

The aqueous medium of the first fluorinated composition is typically water or a combination of water and a water-soluble solvent. Specific examples of the water-soluble solvent include at least one solvent selected from the group of propylene glycol, dipropylene glycol, tripropylene glycol, propylene glycol monomethyl ether, propylene glycol monoethyl ether, dipropylene glyocol monomethyl ether, dipropylene glycol monoether ether, tripropylene glycol monomethyl ether, diacetone alcohol, and combinations thereof. Most typically, the aqueous medium of the first fluorinated composition comprises water or a combination of water and at least one water-soluble solvent selected from the group of propylene glycol, dipropylene glycol and tripropylene glycol. When the aqueous medium of the first fluorinated composition comprises the combination of water and the water-soluble solvent, the water and the water-soluble solvent are typically present in the aqueous medium in a ratio of 99:1 to 15:85 parts by weight water to parts by weight water-soluble solvent. Most typically, the water-soluble solvent is present in an amount of less than 20 parts by weight relative to 100 parts by weight of water and the water-soluble solvent.

The aqueous medium of the first fluorinated composition may comprise a volatile organic solvent. However, the volatile organic solvent of the aqueous medium is generally present in the aqueous medium of the first fluorinated composition in an amount of less than 1.0, alternatively less than 0.5, alternatively less than 0.1, alternatively 0.0 percent by weight based on the total weight of the aqueous medium. As understood in the art, a volatile organic solvent is an organic solvent which volatilizes when stored at room temperature. More specifically, a volatile organic solvent is an organic solvent having a boiling point of at most 100° C. It is to be appreciated that a solvent which forms an azeotropic mixture with water is not included within the definition of volatile organic solvent as utilized herein.

The first fluorinated composition may further comprise components in addition to the fluorinated polymer described above. For example, the first fluorinated composition may further comprise a starch, a resin, a crosslinking agent, a catalyst, an inorganic or organic filler, a coagulant, a supporting agent (e.g. dextrin), a holding agent, a flocculant, a buffering agent, a bactericide, a biocide, a metal ion-sealing agent, a hydrophobizing agent (e.g. alkenyl succinic anhydride and/or alkyl ketene dimer), and the like, as well as various combinations of such components.

Specific examples starches suitable for the first fluorinated composition include, but are not limited to, a hydroxyethylated starch, a cationic starch, an amphoteric starch, an oxidized starch, a phosphorylated starch, an enzyme-modified starch, and combinations thereof.

Specific examples of resins suitable for the purposes of the first fluorinated composition include, but are not limited to, a polyvinyl alcohol, a polyvinyl chloride latex, a polyvinyl alcohol, a polyamideamine epichlorohydrin-modified resin, an N-vinylformaldehyde-vinylamine copolymer, and combinations thereof.

Specific examples of crosslinking agents suitable for the purposes of the first fluorinated composition include, but are not limited to, a condensate or precondensate of urea or melamine-formaldehyde, methylol-dihydroxyethylene-urea or a derivative thereof, urone, methylol-ethylene-urea, methylol-propylene-urea, methylol-triazone, a dicyandiamide-formaldehyde condensate, methylol carbamate, methylol(meth)acrylamide, a polymer thereof, divinyl sulfone, polyamide or a cationic derivative thereof, an epoxy derivative such as glycidyl glycerol, a halide derivative such as (epoxy-2,3-propyl)trimethylammonium chloride or N-methyl-N-(epoxy-2,3-propyl)morpholinium chloride, a pyridinium salt of ethylene glycol chloromethyl ether, and combinations thereof.

Specific examples of catalysts suitable for the purposes of the first fluorinated composition include, but are not limited to, ammonium chloride, an alkanolamine salt, a zirconium acetate salt, and combinations thereof.

Specific examples of fillers inorganic and organic fillers include silica, alumina, sericin, resin powder, talc, kaolin, precipitated calcium carbonate, ground calcium carbonate, bentonite, clays, titanium dioxide, and the like. Such fillers may optionally be utilized in a carrier medium.

The particular components present in the first fluorinated composition, as well as their respective amounts, may very dependent upon the particular fibers employed in the slurry, as well as the desired end use of the treated article formed from the first fluorinated composition. If present, the starch is typically utilized in the first fluorinated composition in an amount to provide from 0.001 to 10, alternatively from 0.005 to 8, alternatively from 0.01 to 6 percent by weight based on the total dry weight of the fibers of the slurry. The fluorinated polymer of the first fluorinated composition is typically present in the first fluorinated composition in an amount to provide from 0.001 to 3.5, alternatively from 0.005 to 2.5, alternatively 0.01 to 1.5 percent by weight of the fluorinated polymer based on the total dry weight of the fibers in the slurry.

The slurry and the first fluorinated composition may be combined to form the mixture according to various methods. For example, the first fluorinated composition may be added to the slurry in a vessel, or the slurry may be added to the first fluorinated composition in a vessel. Alternatively, both the first fluorinated composition and the slurry may be disposed in a vessel contemporaneously. It is to be appreciated that the first fluorinated composition may be formed prior to combining the first fluorinated composition and the slurry, or the individual components or combinations of the individual components of the first fluorinated composition may be individually or discretely combined with the slurry such that the first fluorinated composition is formed in the slurry. Typically, the mixture formed from combining the first fluorinated composition and the slurry is mixed or otherwise blended.

In various embodiments, the mixture is diluted to provide a desired final consistency. Typically, the mixture is diluted such that the fibers are present in the mixture in an amount of from 0.001 to 4.0, alternatively from 0.005 to 3.0, alternatively from 0.01 to 2.0 percent by weight based on the dry weight of the fibers and the total weight of the mixture. It is to be appreciated that the slurry may optionally be diluted prior to forming the mixture instead of or in addition to diluting the mixture. If desired, an additional amount of the first fluorinated composition, or an additional amount of the fluorinated polymer of the first fluorinated composition, may be combined with the mixture once diluted.

The method of the present invention further comprises the step of forming at least one sheet from the mixture. For purposes of clarity, the at least one sheet is referred to herein merely as "the sheet," which is to be understood to encompass even a plurality of sheets. In embodiments where the fibers comprise cellulosic fibers such that the treated article is treated paper, the sheet ultimately becomes paper. Methods of forming sheets are well known in the art. For example, the sheet is typically formed on a metal substrate, such as stainless steel, or what is referred to in the art as monofilament wire. The relative dimensions (e.g. thickness, length, width) of the sheet may vary contingent on a variety of factors, such as the desired end use of the treated article formed via the method.

The sheet is typically dried once formed from the mixture to remove excess water and/or water-soluble solvent therefrom. The sheet may be dried via vacuum and/or foil dewatering. Alternatively, the sheet may be dried via press dewatering, in which a pressure is applied to the sheet. The pressure utilized when the sheet is dried via press dewatering is typically from 0.5 to 200 psig. Further, the sheet may be dried via contract dewatering, in which the sheet is dried via exposure to papermachine clothing, which absorbs excess water and/or the water-soluble solvent from the sheet. In addition, the sheet may be dried via contract drying, in which the sheet is in contact with metal rollers having a smooth surface. The metal rollers utilized in contract drying are typically heated, e.g. from 150 to 280° F. Any combination of these methods, or additional methods of drying the sheet to remove excess water and/or water-soluble solvent which are known in the art, may be employed. In certain embodiments, all of the methods of drying the sheet described above are employed, typically in the order in which they are introduced above.

The method further comprises the step of applying a second fluorinated composition on at least one surface of the sheet to prepare the treated article. In various embodiments, the second fluorinated composition is applied on two or more surfaces of the sheet. For example, most typically, the second fluorinated composition is applied on all major surfaces of the sheet. These major surfaces of the sheet are generally a top and a bottom surface, depending on the relative orientation of the sheet. When the treated article is the treated paper, the major surfaces of the sheet are those having the greatest surface area.

The step of applying the second fluorinated composition on at least one surface of the sheet is not particularly limited so long as it capable of contacting the second fluorinated composition and the sheet. For example, the second fluorinated composition may be applied on at least one surface of the sheet by spraying, brushing, padding, size press coating, metering size press coating, film press coating, gravure coating, flexo coating, roller coating, rotor dampening, foaming, gate roll coating, bill blade coating, bar coating, intaglio coating, reverse roll coating, skid roll coating, transfer (offset) roll coating, knife coating, knife-over-roll coating, J-coating, air knife coating, curtain coating, and combinations thereof.

The second fluorinated composition may be the same as or different from the first fluorinated composition. In certain embodiments, the second fluorinated composition and the first fluorinated composition are the same. In other embodiments, the second fluorinated composition and the first fluorinated composition are different.

In particular, both the first and second fluorinated compositions may be anionic fluorinated compositions, or both the first and second fluorinated compositions may be cationic fluorinated compositions. When the first and second fluorinated compositions are both anionic fluorinated compositions or are both cationic fluorinated compositions, both the first and second fluorinated compositions may comprise the same components in the same relative amounts, or may comprise the same components in different relative amounts, or different components altogether. For example, when the first and second fluorinated compositions are both anionic fluorinated compositions, both the first and second fluorinated compositions may comprise the first fluorinated copolymer (or the second fluorinated copolymer), or the first fluorinated composition may comprise the first fluorinated copolymer and the second fluorinated composition comprises the second fluorinated copolymer, or vice versa. Similarly, when the first and second fluorinated compositions are both cationic fluorinated compositions, both the first and second fluorinated compositions may comprise the third fluorinated copolymer (or the forth fluorinated copolymer), or the first fluorinated composition may comprise the third fluorinated copolymer and the second fluorinated composition comprises the fourth fluorinated copolymer, or vice versa.

Similarly, the second fluorinated composition may comprise any of the additional components described above relative to the first fluorinated composition. For example, the second fluorinated composition may further comprise a starch, a resin, a crosslinking agent, a catalyst, an inorganic or organic filler, a coagulant, a supporting agent (e.g. dextrin), a holding agent, a flocculant, a buffering agent, a bactericide, a biocide, a metal ion-sealing agent, a hydrophobizing agent (e.g. alkenyl succinic anhydride and/or alkyl ketene dimer), and the like, as well as various combinations of such components. Specific examples of these components are set forth above with respect to the first fluorinated composition.

Like the first fluorinated composition, the second fluorinated composition is typically a dispersion of the fluorinated polymer in an aqueous medium. The aqueous medium of the second fluorinated composition is typically water or a combination of water and a water-soluble solvent, as described above relative to the first fluorinated composition.

The second fluorinated composition typically comprises the particular fluorinated copolymer in an amount similar to that employed in the first fluorinated composition. For example, when the second fluorinated composition is the cationic fluorinated composition, the second fluorinated composition typically comprises the particular fluorinated copolymer (e.g. the third and/or fourth fluorinated copolymer) in an amount of from 0.01 to 1.50 percent by weight based on the total weight of the cationic fluorinated composition.

After applying the second fluorinated composition to at least one surface of the sheet, the sheet is typically dried. Drying is carried out at room temperature or a temperature higher than room temperature, and if necessary, heat treatment may be applied.

In certain preferred embodiments, the first fluorinated composition is the anionic fluorinated composition and the second fluorinated composition is the cationic fluorinated composition. In these embodiments, the first fluorinated composition may comprise the first fluorinated copolymer and/or the second fluorinated copolymer, and the second fluorinated composition may comprise the third fluorinated copolymer and/or the fourth fluorinated copolymer. Alternatively, the first fluorinated composition may comprise an anionic fluorinated polymer other than the first and second fluorinated copolymers, and/or the second fluorinated composition may comprise a cationic fluorinated polymer other than the third and fourth fluorinated copolymers.

Typically, in these embodiments, maximum performance of the treated article formed from the method is obtained from utilizing minimal amounts of the fluorinated polymers in the first and second fluorinated compositions, respectively. This significantly reduces costs associated with preparing treated articles. In addition, despite the amount of fluorinated polymers utilized in conventional methods, conventional treated articles typically have desirable resistance to creasing yet have undesirable surface performance, or conventional treated articles have desirable surface performance which suffers considerably when the treated articles are creased or otherwise bent/deformed. However, the method prepares treated articles having both excellent surface performance and resistance to creasing. Additionally, the method of the present invention utilizes the first and second fluorinated compositions, which reduces costs and volume relative to methods utilizing conventional fluorinated compositions.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Preparation Example 1

Dry sheeted samples of bleached hardwood and softwood sulfate pulps are torn by hand into pieces (2 inches×3 inches in size). 384 grams of a mixture of 60% hardwood and 40% softwood pulps are diluted to 10,000 grams in water to form a slurry, and the pulps are left in the slurry to soak for 48 hours at ambient conditions. The slurry is separated into two samples, which each comprise 5,000 grams of the slurry. Each of the samples is blended for ten seconds to disintegrate the pulps. The samples are each diluted to 23 kg to form two diluted mixtures. The diluted mixtures are refined for 1.5 hours to separate individual fibers of the disintegrated pulps. Both of the diluted mixtures included fibers in an amount of 1.6% by weight based on the dry weight of the fibers relative to the total weight of the respective diluted mixture. Accordingly, each of the diluted samples were identical such that either of the diluted samples may be utilized in the Examples below.

Examples 1-13

Various treated articles are formed in accordance with the method from the diluted mixtures, i.e., pulp slurries, formed in Preparation Example 1, as described in greater detail below.

In particular, each of the diluted mixtures of Examples 13 is treated with a 1% solution of a cationic fix agent (0.05% by weight based on the total dry weight of fibers in the diluted mixtures). Then, a pre-gelatinized cationic starch is added to each of the diluted mixtures in an amount of 1.00% by weight based on the total dry weight of fibers in the diluted mixtures. A first fluorinated composition which comprises a first fluorinated copolymer is added to each of the diluted mixtures. The first fluorinated copolymer comprises a cationic fluorinated copolymer. The amount of the cationic fluorinated copolymer employed in each of the first fluorinated compositions is set forth below in Table 1.

Each of the diluted mixtures, once the respective first fluorinated compositions are combined therewith, is formed into a sheet via a circular TAPPI sheet former (0.02 square meters in area). Each of the sheets has a mass of roughly 60 grams per square meter. Each sheet is press dried and then contact dried at 110° C. for one minute. Then, a second fluorinated composition is applied to each of the sheets. The second fluorinated composition comprises a second fluorinated copolymer. The second fluorinated copolymer is the same as the first fluorinated copolymer, i.e., the second fluorinated copolymer is also the cationic fluorinated copolymer. The amount of the cationic fluorinated copolymer in each of the second fluorinated compositions is set forth below in Table 1. The second fluorinated compositions are applied to the respective sheets at ambient conditions. Once the second fluorinated compositions are applied to the respective sheets, the sheets are contact dried at 110° C. for one minute to form treated articles.

Mass balances are taken for each sheet to determine the wet coating uptake of the second fluorinated composition by each sheet. The respective wet coating uptake values are set forth in Table 1 below. Physical properties of each treated article are measured in accordance with TAPPI Kit Test T 559 cm-02, entitled "Great resistance test for paper and paperboard." The value obtained from the TAPPI Kit Test for each treated article is set forth below in Table 1. Physical properties of each treated article are also measured in accordance with Cobb Size Test T441 om-09, entitled "Water absorptiveness of sized (non-bibulous) paper, paperboard, and corrugated fiberboard (Cobb test)." The value obtained from the Cobb test for each treated article is set forth below in Table 1.

TABLE 1

| Trial | Wt % First Fluorinated Copolymer | Wt % Second Fluorinated Copolymer | Wet Coating Uptake (gsm) | TAPPI Kit Value | Cobb (gsm) |
|---|---|---|---|---|---|
| 1 | 0.4 | 0.4 | 16.65 | 8.00 | 23.50 |
| 2 | 0.7 | 0.1 | 15.35 | 5.50 | 37.00 |
| 3 | 0.4 | 0.7 | 16.78 | 8.67 | 24.00 |
| 4 | 0.4 | 0.4 | 16.64 | 8.17 | 22.00 |
| 5 | 0.4 | 0.4 | 16.44 | 8.50 | 23.50 |
| 6 | 0.1 | 0.7 | 21.11 | 13.00 | 22.00 |
| 7 | 0.1 | 0.4 | 20.8 | 11.00 | 22.00 |
| 8 | 0.4 | 0.1 | 16.35 | 5.50 | 49.50 |
| 9 | 0.4 | 0.4 | 16.45 | 8.50 | 23.00 |
| 10 | 0.7 | 0.4 | 14.22 | 6.00 | 23.00 |
| 11 | 0.7 | 0.7 | 14.72 | 9.17 | 22.00 |
| 12 | 0.1 | 0.1 | 21.3 | 4.00 | 85.00 |
| 13 | 0.4 | 0.4 | 16.1 | 8.50 | 24.00 |

Examples 14-26

Various treated articles are formed in accordance with the method from the diluted mixtures, i.e., pulp slurries, formed in Preparation Example 1, pursuant to the method describe above relative to Examples 1-13. However, Examples 14-26 differ from Examples 1-13 relative to the particular first and second fluorinated compositions employed. Specifically, the first fluorinated copolymer of the first fluorinated composition of Examples 14-26 comprises an anionic fluorinated copolymer. The second fluorinated copolymer of the second fluorinated composition of Examples 14-26 comprises a cationic fluorinated copolymer. The respective amounts of the anionic and cationic fluorinated copolymers employed in the first and second fluorinated compositions are set forth below in Table 2.

TABLE 2

| Trial | Wt % First Fluorinated Copolymer | Wt % Second Fluorinated Copolymer | Wet Coating Uptake (gsm) | TAPPI Kit Value | Cobb (gsm) |
|---|---|---|---|---|---|
| 14 | 0.4 | 0.4 | 22.44 | 8.30 | 34.00 |
| 15 | 0.7 | 0.1 | 15.78 | 10.00 | 21.50 |
| 16 | 0.4 | 0.7 | 21.61 | 10.00 | 35.00 |
| 17 | 0.4 | 0.4 | 21.72 | 8.70 | 34.00 |
| 18 | 0.4 | 0.4 | 23.06 | 8.30 | 34.50 |
| 19 | 0.1 | 0.7 | 26.65 | 13.00 | 31.00 |
| 20 | 0.1 | 0.4 | 25.50 | 10.00 | 26.00 |
| 21 | 0.4 | 0.1 | 22.72 | 7.00 | 58.00 |
| 22 | 0.4 | 0.4 | 21.89 | 8.50 | 34.00 |
| 23 | 0.7 | 0.4 | 15.28 | 11.00 | 26.00 |
| 24 | 0.7 | 0.7 | 15.67 | 12.00 | 26.50 |
| 25 | 0.1 | 0.1 | 26.80 | 7.00 | 33.00 |
| 26 | 0.4 | 0.4 | 23.13 | 8.00 | 35.00 |

Examples 27-39

Various treated articles are formed in accordance with the method from the diluted mixtures, i.e., pulp slurries, formed in Preparation Example 1, pursuant to the method describe above relative to Examples 1-13. However, Examples 27-39 differ from Examples 1-13 relative to the particular first and second fluorinated compositions employed. Specifically, the first fluorinated copolymer of the first fluorinated composition of Examples 27-39 comprises an anionic fluorinated copolymer. The second fluorinated copolymer of the second fluorinated composition of Examples 27-39 comprises the same anionic fluorinated copolymer as the first fluorinated composition. The respective amounts of the anionic fluorinated copolymers employed in the first and second fluorinated compositions are set forth below in Table 3.

TABLE 3

| Trial | Wt % First Fluorinated Copolymer | Wt % Second Fluorinated Copolymer | Wet Coating Uptake (gsm) | TAPPI Kit Value |
|---|---|---|---|---|
| 27 | 0.4 | 0.4 | 21.75 | 6.00 |
| 28 | 0.7 | 0.1 | 16.75 | 7.00 |
| 29 | 0.4 | 0.7 | 21.25 | 7.00 |
| 30 | 0.4 | 0.4 | 22.75 | 5.83 |
| 31 | 0.4 | 0.4 | 22.00 | 6.00 |
| 32 | 0.1 | 0.7 | 37.00 | 12.00 |
| 33 | 0.1 | 0.4 | 35.00 | 10.33 |
| 34 | 0.4 | 0.1 | 21.25 | 6.00 |
| 35 | 0.4 | 0.4 | 22.00 | 6.00 |
| 36 | 0.7 | 0.4 | 16.00 | 7.00 |
| 37 | 0.7 | 0.7 | 15.25 | 7.17 |
| 38 | 0.1 | 0.1 | 36.00 | 7.00 |
| 39 | 0.4 | 0.4 | 21.00 | 6.17 |

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described above.

What is claimed is:

1. A method of preparing a treated article, said method comprising the steps of:
providing a slurry comprising fibers;
combining the slurry and a first fluorinated composition to form a mixture;
forming at least one sheet from the mixture; and
applying a second fluorinated composition on at least one surface of the at least one sheet to prepare the treated article;
wherein the first fluorinated composition is further defined as an anionic fluorinated composition comprising a fluorinated polymer and wherein the second fluorinated composition is further defined as an anionic fluorinated composition comprising a fluorinated polymer, wherein a ratio of the amount of the fluorinated polymer in the first fluorinated composition to the amount of the fluorinated polymer in the second fluorinated composition is from 1:4 to 1:7.

2. A method as set forth in claim 1 wherein the fibers are further defined as cellulosic fibers and the treated article is further defined as a treated cellulosic article.

3. A method as set forth in claim 1 wherein the fluorinated polymer of the anionic fluorinated composition of the first and/or second fluorinated composition comprises a first fluorinated copolymer comprising from 40 to 98 mass % of polymerized units (a') based on monomer (a), from 1 to 50 mass % of polymerized units (b') based on monomer (b) and from 1 to 10 mass % of polymerized units (c') based on monomer (c);

wherein monomer (a) comprises a compound represented by $(Z—Y)_aX$, wherein Z is a $C_{1-6}$ perfluoroalkyl group or a monovalent group represented by $C_bF_{2b+1}O(CFWCF_2O)_cCFK—$, wherein b is an integer of from 1 to 6, c is an integer of from 1 to 4, and each of W and K which are independent of each other, is a fluorine atom or a trifluoromethyl group, Y is a single bond or a bivalent organic group containing no fluorine atom, a is 1 or 2, provided that when a is 1, X is $—CR=CH_2$, $—COOCR=CH_2$, $—OCOCR=CH_2$, $—OCH_2\text{-}\phi\text{-}CR=CH_2$ or $—OCH=CH_2$, and when a is 2, X is $—CH[—(CH_2)_dCR=CH_2]—$, $—CH[—(CH_2)_dCOOCR=CH_2]—$, $—CH[—CH_2)_dOCOCRH_2]—$ or $—OCOCH=CHCOO—$, R is a hydrogen atom, a methyl group or a halogen atom, $\phi$ is a phenylene group, d is an integer of from 0 to 4, and when a is 2, two (Z—Y) present in one molecule may be the same or different from each other;

wherein monomer (b) comprises a compound represented by $CH_2=CR^1\text{-}G\text{-}(R^2O)_e—R^3$, wherein $R^1$ is a hydrogen atom or a methyl group, $R^2$ is a $C_{2-4}$ alkylene group, or a $C_{2-3}$ alkylene group having some or all of its hydrogen atoms substituted by hydroxyl groups, e is an integer of from 1 to 10, G is $—COO(CH_2)_f—$ or $—COO(CH_2)_g—NHCOO—$, wherein f is an integer of from 0 to 4, and g is an integer of from 1 to 4, and $R^3$ is a hydrogen atom, a methyl group, an acryloyl group, a methacryloyl group or an allyl group; and wherein monomer (c) comprises a compound represented by $CH_2=C(COOH)\text{-}Q\text{-}COOH$, wherein Q is a $C_{1-4}$ alkylene group, or a $C_{2-3}$ alkylene group having some or all of its hydrogen atoms substituted by hydroxyl groups, and in the monomer (c), some or all of the carboxyl groups may form at least one salt selected from an ammonium salt and an organic amine salt.

4. A method as set forth in claim 3 wherein the anionic fluorinated composition of the first and/or second fluorinated composition comprises the first fluorinated copolymer in an amount of from 0.01 to 1.50 percent by weight based on the total dry weight of the fibers.

5. A method as set forth in claim 1 wherein the fluorinated polymer of the anionic fluorinated composition of the first and/or second fluorinated composition comprises a second fluorinated copolymer comprising repeating units derived from:

(a) a fluorine-containing monomer having a fluoroalkyl group represented by the general formula:

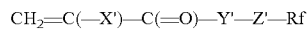

$$CH_2=C(—X')—C(=O)—Y'—Z'—Rf$$

wherein X' represents a hydrogen atom, a linear or branched $C_1$ to $C_{21}$ alkyl group, a halogen atom, a $CFX^1X^2$ group wherein $X^1$ and $X^2$ are a hydrogen atom, a halogen atom, a cyano group, a linear or branched $C_1\text{-}C_{21}$ fluoroalkyl group, a substituted or non-substituted benzyl group, or a substituted or non-substituted phenyl group;

Y' is $—O—$ or $—NH—$;

Z' is a $C_1\text{-}C_{10}$ aliphatic group, a $C_6\text{-}C_{10}$ aromatic or cyclic aliphatic group, a $—CH_2CH_2N(R^4)SO_2—$ group wherein $R^4$ is a $C_1\text{-}C_4$ alkyl group, a $—CH_2CH(OZ^1)CH_2—$ group wherein $Z^1$ is a hydrogen atom or an acetyl group, a —(CH$_2$)$_h$—SO$_2$—(CH$_2$)$_i$— group or a —(CH$_2$)$_h$—S—(CH$_2$)$_i$— group wherein h is 1-10 and i is 0-10; and Rf is a C$_1$-C$_6$ linear or branched fluoroalkyl group;

(b) a hydrophilic monomer, and (c) a monomer having an anion-donating group, wherein a weight average molecular weight of the second fluorinated copolymer is 100,000 or more.

6. A method as set forth in claim 5 wherein the anionic fluorinated composition of the first and/or second fluorinated composition comprises the second fluorinated copolymer in an amount of from 0.01 to 1.50 percent by weight based on the total dry weight of the fibers.

7. A method as set forth in claim 1 wherein the first fluorinated composition further comprises water and a water-soluble solvent selected from the group of propylene glycol, dipropylene glycol, tripropylene glycol, propylene glycol monomethyl ether, propylene glycol monoethyl ether, dipropylene glyocol monomethyl ether, dipropylene glycol monoether ether, tripropylene glycol monomethyl ether, and combinations thereof.

8. A method as set forth in claim 1 wherein the second fluorinated composition further comprises water and a water-soluble solvent selected from the group of propylene glycol, dipropylene glycol, tripropylene glycol, propylene glycol monomethyl ether, propylene glycol monoethyl ether, dipropylene glyocol monomethyl ether, dipropylene glycol monoether ether, tripropylene glycol monomethyl ether, and combinations thereof.

9. A method as set forth in claim 1 wherein the first fluorinated composition and the second fluorinated composition each independently further comprise a starch.

10. A method as set forth in claim 1 wherein the step of applying the second fluorinated composition on at least one surface of the at least one sheet comprises applying the second fluorinated composition by spraying, brushing, padding, size press coating, metering size press coating, film press coating, gravure coating, flexo coating, roller coating, rotor dampening, foaming, gate roll coating, bill blade coating, bar coating, intaglio coating, reverse roll coating, skid roll coating, transfer (offset) roll coating, knife coating, knife-over-roll coating, J-coating, air knife coating, curtain coating, and combinations thereof.

11. A method as set forth in claim 1 further comprising the step of refining the fibers by subjecting the fibers to a shear force.

12. A method as set forth in claim 1 further comprising the step of drying the sheet prior to the step of applying the second fluorinated composition on at least one surface of the sheet.

13. A method as set forth in claim 1 wherein the step of applying the second fluorinated composition comprises applying the second fluorinated composition on all major surfaces of the at least one sheet.

14. A method as set forth in claim 1 further comprising the step of drying the sheet after the step of applying the second fluorinated composition on at least one surface of the sheet.

15. A method of preparing a treated cellulosic article, said method comprising the steps of:

providing a slurry comprising cellulosic fibers;

combining the slurry and a first fluorinated composition, which comprises an anionic fluorinated composition, to form a mixture;

forming at least one sheet from the mixture; and applying a second fluorinated composition, which comprises an anionic fluorinated composition, on at least one surface of the at least one sheet to prepare the treated cellulosic article;

wherein the anionic fluorinated composition of the first and second fluorinated compositions independently comprise a fluorinated polymer; and wherein a ratio of the amount of the fluorinated polymer in the first fluorinated composition to the amount of the fluorinated polymer in the second fluorinated composition is from 1:4 to 1:7.

16. A method of preparing a treated article, said method comprising the steps of:

providing a slurry comprising fibers;

combining the slurry and a first fluorinated composition to form a mixture;

forming at least one sheet from the mixture; and applying a second fluorinated composition on at least one surface of the at least one sheet to prepare the treated article;

wherein the first fluorinated composition is further defined as an anionic fluorinated composition comprising from 0.1 to 0.7 wt. % of a first fluorinated copolymer, and wherein the second fluorinated composition is further defined as an anionic fluorinated composition comprising from 0.1 to 0.7 wt. % of a second fluorinated copolymer; and wherein a ratio of the amount of the first fluorinated copolymer in the first fluorinated composition to the amount of the second fluorinated copolymer in the second fluorinated composition is from 1:4 to 1:7.

17. A treated article formed in accordance with the method of claim 16.

18. A treated sheet of paper formed in accordance with the method of claim 16.

19. A method of preparing a treated article, said method comprising the steps of:

providing a slurry comprising fibers;

combining the slurry and a first fluorinated composition to form a mixture;

forming at least one sheet from the mixture; and applying a second fluorinated composition on at least one surface of the at least one sheet to prepare the treated article;

wherein each of the first and second fluorinated compositions independently comprises at least one fluorinated copolymer, wherein the total amount of fluorinated copolymer in the first fluorinated composition is from 0.1 to 0.7 wt. %, and the total amount of fluorinated copolymer in the second fluorinated composition is from 0.1 to 0.7 wt. %, so long as the total amount of the fluorinated copolymer in the first fluorinated composition is less than the total amount of fluorinated copolymer in the second fluorinated composition.

* * * * *